United States Patent [19]

Dorner

[11] 3,923,148
[45] Dec. 2, 1975

[54] CONVEYING SYSTEM
[75] Inventor: Wolfgang C. Dorner, Hartland, Wis.
[73] Assignee: Dorner Tool & Die, Inc., Milwaukee, Wis.
[22] Filed: Feb. 26, 1974
[21] Appl. No.: 445,988

Related U.S. Application Data
[62] Division of Ser. No. 258,698, June 1, 1972, abandoned.

[52] U.S. Cl. .................. 198/75; 198/190; 198/203; 74/230.01; 308/20
[51] Int. Cl.² ........................................ B65G 37/00
[58] Field of Search ............ 198/25, 190, 203, 208, 198/230; 29/110; 74/230.01; 308/8, 15, 237 R, 20

[56] References Cited
UNITED STATES PATENTS
| | | | |
|---|---|---|---|
| 598,192 | 2/1898 | Alkire | 198/190 |
| 2,504,948 | 4/1950 | Ferguson | 198/190 |
| 3,288,275 | 11/1966 | Bunting | 198/230 |

Primary Examiner—Evon C. Blunk
Assistant Examiner—Joseph E. Valenza
Attorney, Agent, or Firm—Andrus, Sceales, Starke & Sawall

[57] ABSTRACT

A conveying system having particular use for a stamping press. One or more endless belt conveyors are located in the space beneath the die shoe and the bolster plate of the stamping press, and the stamped parts falling from the die cavity are collected on the conveyors. Each conveyor includes an endless belt which is supported at its ends by a pair of spindles, and at least one of the spindles is provided with a non-circular bore. A drive shaft extends through the aligned bores in the spindles of the series of conveyors, and rotation of the shaft acts to drive the conveyors in synchronization. A provision is made to tighten each belt by utilizing a series of staggered pins which extend transversely of the belt. By training the belt over one or more of the staggered pins the desired degree of tension can be maintained on the belt.

7 Claims, 6 Drawing Figures

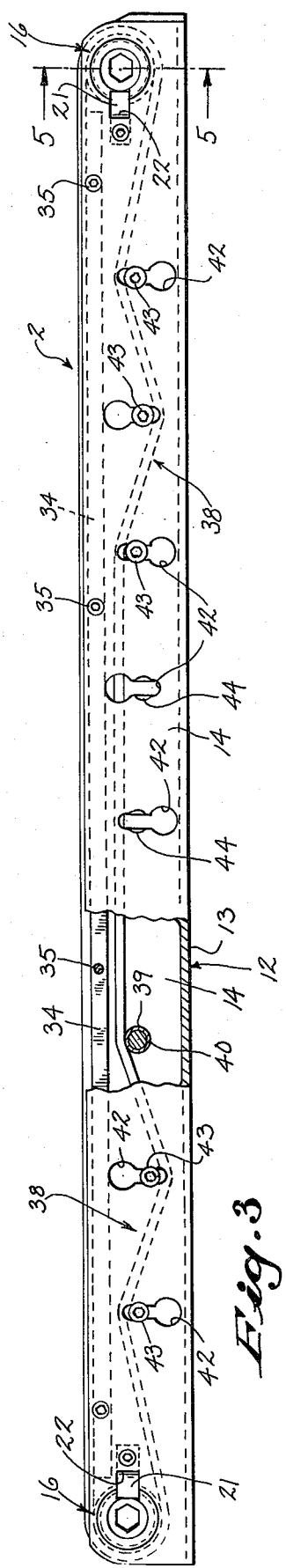
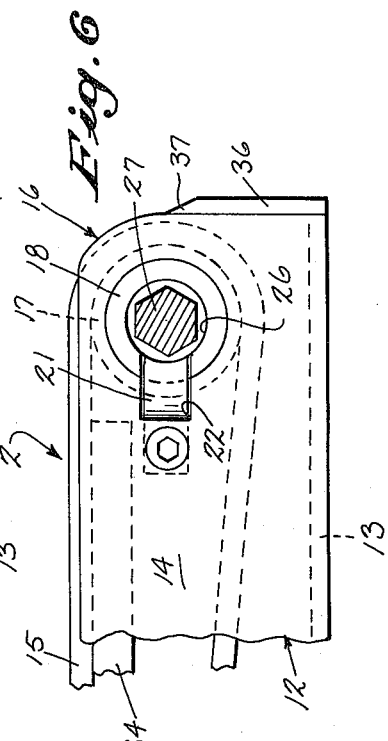
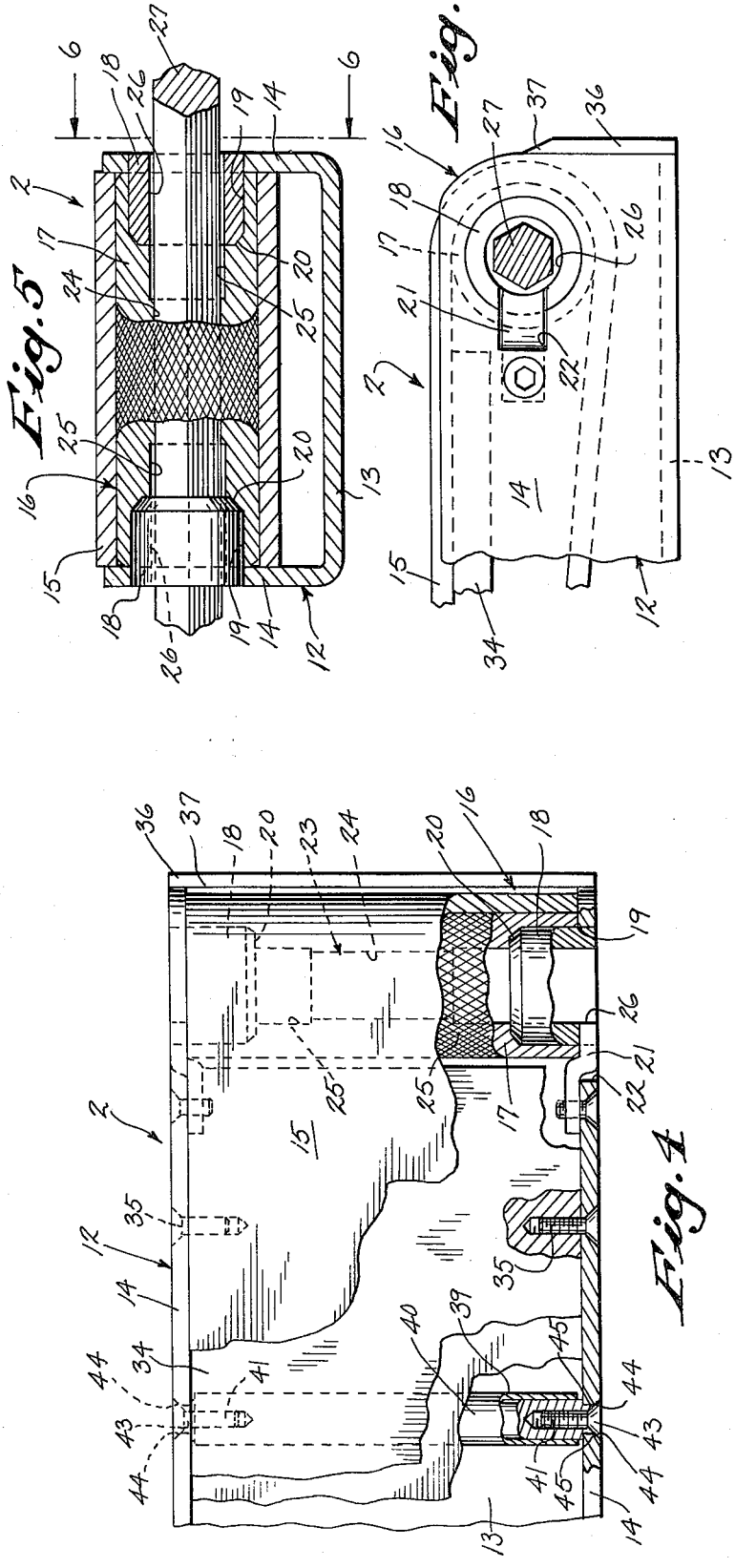

CONVEYING SYSTEM

This is a division of application Ser. No. 258,698 filed June 1, 1972, now abandoned.

BACKGROUND OF THE INVENTION

The conventional stamping press includes a die block having a series of die cavities, and as the parts are stamped they fall from the die cavity through the die shoe and into the space between the die shoe and the bolster plate. Problems have arisen in the effective removal of the parts from this space. In order for oil coated parts or slugs to slide by gravity down an inclined surface, the surface must have an inclination of approximately 19° and there is not sufficient space between the conventional die shoe and bolster plate to include a chute having this inclination.

In some situations, openings have been formed in the bolster plate through which the parts can fall to a storage bin or other collection zone. However, as the press may be used periodically for the stamping of parts of different sizes, the openings in the bolster plate may not accommodate all sizes of parts, with the result that several bolster plates may be required and this not only involves a substantial cost but necessitates changing of the bolster plates and down-time of the press.

Attempts have also been made in the past to remove the parts from beneath the die shoe by use of a manual pusher which is periodically pushed through the space to move the parts across the bolster plate to a collection bin. However, this requires manual labor and in many cases it is difficult to completely clear all of the parts from within the space.

In other situations a trough or pan has been placed within the clearance in the bolster plate and the die shoe, and periodically the pan is slid from its location and dumped. However, this not only requires manual labor for dumping of the pan, but also requires that the press be stopped while the pan is removed for emptying.

SUMMARY OF THE INVENTION

The present invention relates to a conveyor system which has particular use with a stamping press and acts to automatically remove the stamped parts or scrap from the location between the die shoe and the bolster plate. According to the invention, one or more endless conveyors are located in the space between the die shoe and the bolster plate of the stamping press and as the parts fall from the die cavity and through the die shoe, they are collected on the conveyors and delivered to a collection location.

Each conveyor includes a frame and an endless belt is mounted for travel on a pair of spindles which are located at the ends of the frame. At least one of the spindles of each conveyor is provided with a non-circular opening or bore and a drive shaft extends through the aligned openings in the spindles of the several conveyors and acts to simultaneously drive all of the conveyors of the series.

The conveying system also includes a provision to tighten each belt by utilizing a series of guides or pins which are located in staggered relation in the side walls of the conveyor frame. By training the belt over one or more of the staggered pins, the desired tension can be maintained on the belt at all times.

The conveying system of the invention provides continuous operation for the removal of stamped parts or scrap from the press without the necessity of stopping operation of the press for removal of the parts.

The conveying system is versatile and is fabricated in various sizes to accommodate a wide variety of press constructions. For example, by combining several conveyors in a side-by-side relation any desired conveyor width can be achieved. In addition, the conveyors can be made with a variety of lengths so that they can be utilized with presses of different sizes.

As a single motor is employed to power all of the conveyors, the overall cost of the unit is decreased and additional conveyors can be added to the drive system by merely inserting the drive shaft through the drive spindle of the conveyor.

Other objects and advantages will appear in the course of the following description.

DESCRIPTION OF THE DRAWINGS

The drawings illustrate the best mode presently contemplated of carrying out the invention.

In the drawings:

FIG. 3 is a side view of a conveyor;

FIG. 4 is a top view of a conveyor;

FIG. 5 is a transverse section taken along line 5—5 of FIG. 4 and showing the drive spindle; and FIG. 6 is a view taken along line 6—6 of FIG. 5.

Figure 1:
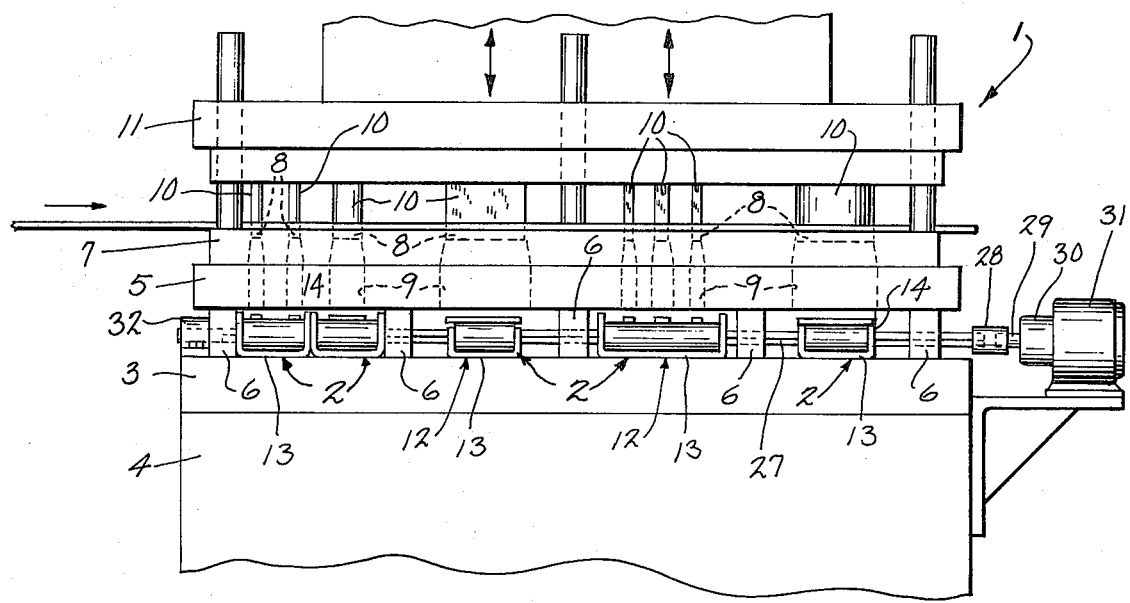
FIG. 1 is a front view of a conventional stamping press utilizing the conveyor system of the invention.

The drawings illustrate a conventional stamping press 1, and a conveying system composed of a series of endless belt conveyors 2 is associated with the press and acts to convey the stamped parts or scrap from the press.

The stamping press 1 includes a bolster plate 3 which is mounted on a suitable frame or support 4. A die shoe 5 is spaced above the bolster plate by a series of parallel spacers 6 and a die block 7 is mounted on the die shoe 5. Die block 7 is provided with a series of die cavities 8 each die cavity communicates with an opening 9 in the die shoe 5, so that as the metal blank is stamped the stamped parts or slugs will fall from the die cavity 8 through the opening 9 into the space between the bolster plate 3 and the die shoe 5.

Figure 2:
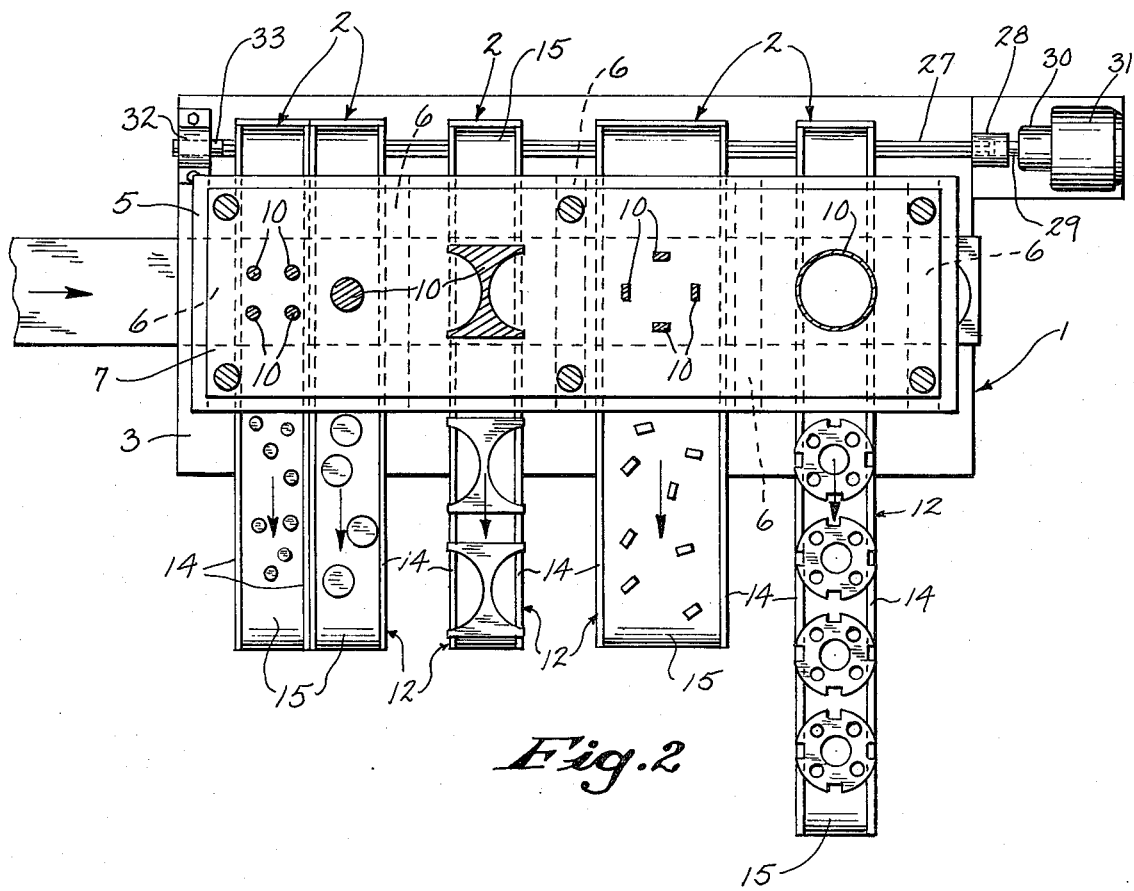
FIG. 2 is a section taken along line 2—2 of FIG. 1.

As shown in FIGS. 1 and 2, the conveyors 2 are located in parallel relation within the space between the bolster plate 3 and the die shoe 5 and as the parts fall from the die cavity 8 through the opening 9 they are collected on the respective conveyors 2.

A punch 10 is mounted on a movable punch holder 11 and is adapted to cooperate with the die cavities 8 to stamp the parts from the metal blank.

As illustrated in FIGS. 3 and 4, each of the conveyors 2 includes a generally U-shaped frame 12 composed of a bottom wall 13 and a pair of side walls 14 which extends upwardly from the bottom wall. An endless belt 15 is mounted for travel on a pair of spindle assemblies 16 which are located at the ends of the frame 12.

As best shown in FIG. 5, each spindle assembly 16 includes a generally cylindrical spindle 17 which extends between the side walls 14 and has an outer knurled surface which is engaged with the belt 15. A bushing 18 is freely inserted within a recess 19 in each end of the spindle and the inner end of the bushing 18 bears against an internal shoulder 20 in the spindle.

Each bushing 18 is retained within the respective recess 19 in the spindle by means of a keeper 21 which is secured to the inner surface of side wall 14 and extends through a slot 22 in the side wall. The end of keeper 21 is received within a slot in the end of the bushing and serves to prevent axial displacement of the bushing as well as rotation.

The spindle 17 is provided with a bore 23 which communicates with the recesses 19 at the ends of the spindle. The central portion 24 of the bore 23 is provided with a non-circular shape end as shown in the drawings, the central portion 24 has a hexagonal shape. The end portions 25 of the bore 23 are circular in shape and have a larger diameter than that of the central portion 24. Each bushing 18 is provided with a bore 26 which communicates with the bore 23 and has a substantially greater diameter than the bore 23.

The series of conveyors 2 are driven by a shaft 27 which extends through the aligned bores 23 in the spindles. As shown in the drawings, the shaft 27 has a generally hexagonal shape which complements that of the central portion 24 of each bore 23.

One end of the shaft 27 is connected by a coupling 28 to the output shaft 29 of a gear box 30 which is driven by a motor 31 mounted on the bolster plate. The opposite end of the shaft can be journalled within a suitable bearing block 32 mounted on the bolster plate. As shown in FIG. 2, the end 33 of the shaft 27 has a cylindrical outer contour which is journalled within the bearing block 32.

To support the belt 15 of each conveyor 2 in its conveying path of travel, a support plate 34 is mounted between the side walls 14 of the frame 12. Plate 34 is secured to the side walls by a series of screws 35.

A wiper member 36 having a sharpened upper edge 37 is located at the discharge end of each conveyor and rides against the belt 15. As the parts being discharged from the die are generally coated with oil, small parts may tend to adhere to the belt 15, and the wiper 36 acts to scrape the belt and remove any parts that may cling to the belt.

Each conveyor 2 also includes a tensioning mechanism, indicated generally by 38, which develops the desired tension on the belt 15. The tensioning mechanism 38 includes a series of pins 39 which extend transversely of the conveyor and a sleeve 40 is rotatably mounted on each pin and extends between the side walls 14. Screws 41 are engaged with each end of the pin 37 and each screw extends through a key-hole shaped opening 42 in the side wall 14. The head 43 of each screw 41 is normally received within a countersunk recess 44 in the side wall to prevent the screw, when threaded down, from moving within the opening 42. As shown in FIG. 3, the adjusting pins 39 are disposed in staggered relation and by inserting or removing pins, and training the belt over and under a greater or lesser number of pins, the tension on the belt can be correspondingly adjusted. The pins 39 are not adapted to be moved within the keyhole shaped openings 42 to provide the adjustment, but due to the engagement of the screw heads 43 with the countersunk recesses 44, are fixed in position. Thus, the adjustment is provided by utilizing additional pins or removing pins from the conveyor.

To facilitate removal of the pins 39, each end of the pin is provided with parallel flatened sides 45. After one of the screws 41 is removed from the end of the pin 39, the pin is then pushed toward the remaining screw causing the flatened edges 45 to be engaged within the slot portion of the keyhole-shaped opening 42. This will prevent rotation of the pin 39 while the remaining screw 41 is unthreaded from the pin.

As shown in FIG. 1, the side walls 14 of the conveyor can terminate approximately flush with the upper conveying run of the belt 15 or can extend a substantial distance above the upper run of the belt. The latter construction is preferred when conveying small parts and for larger parts, the former construction can be used, in which case the stamped part can be considerably wider than the width of the belt.

The conveyors 2 are fabricated in a series of different widths, and by combining one or more conveyors in a side-by-side relation, as shown in FIG. 1, any desired conveyor width can be obtained. The keepers 21, which serve to retain the bushings 18 within the recesses in the ends of the spindle 17, are located within the confines of the side walls 14 so that the keepers will not interfere with the positioning of the conveyors in side-by-side relation.

The conveyors 2 are all driven by a single motor 31 and the conveyors can be disengaged from the drive mechanism merely by withdrawing the shaft 27 from the drive spindles 17. As the axes of the spindles 17 are fixed and disposed in precise parallel relation to each other, there is no tendency for the belt to move laterally as it travels in its endless path.

The conveyors 2 act to continuously remove all of the stamped parts or slugs from the space between the bolster plate and the die shoe and thereby eliminate downtime for the press for part removal.

Various modes of carrying out the invention are contemplated as being within the scope of the following claims particularly pointing out and distinctly claiming the subject matter which is regarded as the invention.

I claim:

1. A conveyor system, comprising a series of endless belt conveyors disposed in side-by-side relation, each conveyor having a pair of spaced side walls and including a drive spindle and an idler spindle and an endless belt trained over the drive spindle and the idler spindle, the ends of the spindles disposed inwardly of the respective side walls, each drive spindle having a non-circular bore and the bores of the spindles being disposed in axial alignment, a drive shaft disposed within the aligned bores of the spindles and having a non-circular peripheral surface to complement the bores, each end of the drive spindle being provided with an axial recess, a bushing secured within an aperture in the side wall and received within the recess in the corresponding end of the spindle, whereby the ends of the spindle are journalled on the respective bushings each bushing having a central opening to receive the shaft with the diameter of the central opening being greater than the external dimension of the shaft so that the shaft is out of contact with the bushing, and drive means operatively connected to the shaft to drive the shaft and simultaneously operate the series of conveyors.

2. The conveying system of claim 1, wherein the outer end of each bushing is disposed substantially flush with the outer surface of the respective side wall, and said system includes means for locking each bushing within the respective aperture.

3. The conveyor system of claim 1, wherein said system includes a plurality of guide members extending between the side walls and disposed in staggered relation, means for removably connecting the guide members to the side walls, said belt being trained around a series of the staggered guide members to provide the desired tension on the belt.

4. The conveying system of claim 3 and including locking means for locking each guide member with respect to the side walls, each guide member and the corresponding guide member being located wholly within the plane of the outer surface of the respective side wall.

5. The conveying system of claim 4 wherein each guide member includes a pin fixed in position with respect to said side walls, and a sleeve journalled on said pin.

6. The conveying system of claim 2, wherein the means for locking each bushing comprises a keeper having a first portion disposed within a slot in the outer end of the bushing and having a second portion extending through an opening in the side wall and secured to the inner surface of said side wall, said keeper being located wholly within the plane of the outer surface of the respective side wall.

7. A conveyor system, comprising a series of endless belt conveyors disposed in side-by-side relation, each conveyor having a pair of spaced side walls and including a drive spindle and an idler spindle and an endless belt trained over the drive spindle and the idler spindle, the ends of the spindle disposed inwardly of the respective side walls, each drive spindle having a non-circular bore and the bores of the spindles being disposed in axial alignment, a drive shaft disposed within the aligned bores of the spindles and having a non-circular peripheral surface to complement the bores, each end of the drive spindle being provided with an axial recess, a bushing secured within an aperture in the side wall and received within the recess in the corresponding end of the spindle, whereby the ends of the spindle are journalled on the respective bushings, each bushing having a central opening to receive the shaft with the diameter of the central opening being greater than the external dimension of the shaft so that the shaft is out of contact with the bushing, drive means operably connected to the shaft to drive the shaft and simultaneously operate the series of conveyors, and a locking member for locking each bushing within the respective aperture, each bushing and the corresponding locking member being located wholly within the plane of the outer surface of the respective side wall whereby the conveyor is free of laterally extending projections.

* * * * *

UNITED STATES PATENT AND TRADEMARK OFFICE
CERTIFICATE OF CORRECTION

PATENT NO. : 3,923,148
DATED : December 2, 1975.
INVENTOR(S) : WOLFGANG C. DORNER It is certified that error appears in the above-identified patent and that said Letters Patent are hereby corrected as shown below:

Column 5   Line 8   Cancel "guide members" and substitute therefor ---locking means---

Signed and Sealed this

Seventh Day of September 1976

[SEAL]

Attest:

RUTH C. MASON
*Attesting Officer*

C. MARSHALL DANN
*Commissioner of Patents and Trademarks*